W. B. Barnard,
Wick Trimmer,
N° 45,574.     Patented Dec. 27, 1864.

Witnesses:
H. King
Randolph Coyle Jr.

Inventor:
William B. Barnard
By Robbins & Burr
Atty's

UNITED STATES PATENT OFFICE.

WILLIAM B. BARNARD, OF WATERBURY, CONNECTICUT.

IMPROVED LAMP-TRIMMER SHEARS.

Specification forming part of Letters Patent No. 45,574, dated December 27, 1864.

*To all whom it may concern:*

Be it known that I, WILLIAM B. BARNARD, of Waterbury, in the county of New Haven and State of Connecticut, have invented certain new and useful Improvements in the Manufacture of Lamp-Trimmers, Shears, and Similar Cutting-Instruments; and I do hereby declare that the following is a full and exact description thereof, reference being had to the accompanying drawings, forming a part of this specification, and in which—

Figure 1:
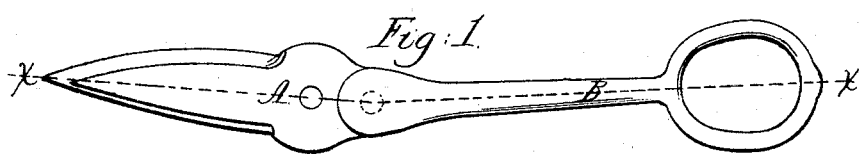
Figure 2:
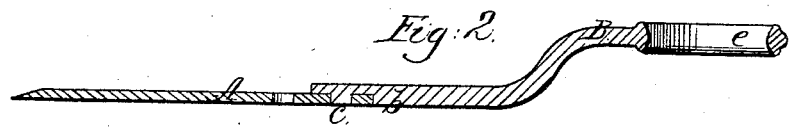
Figure 3:

Figure 1 is a plan view of one of the handles of a pair of lamp-trimmers with the cutting-blade attached; Fig. 2, a longitudinal section in the line $x\ x$ of Fig. 1; Fig. 3, a similar section, showing the blade and handle when riveted together and before the blade is ground down and finished; and Fig. 4, a plan view of a finished pair of lamp-trimmers opened.

Similar letters indicate like parts in each of the drawings.

My improvements in the manufacture of lamp-trimmers or shears consist in so forming the handles and blades as that there shall be no offset or shoulder upon the contiguous or opposite faces of each half of the shears near the pivot upon which they turn, and in uniting the handle to the cutting-blade in each division of the shears, when formed without offsets, by means of rivets, whereby I obviate the danger of impairing the life and keen qualities of the blade consequent upon heating the same to the degree required to make a welded joint, as heretofore practiced.

The object of my invention is to reduce the cost of shears and lamp-trimmers, and at the same time secure greater and more perfect uniformity in their temper and quality.

Figure 4:
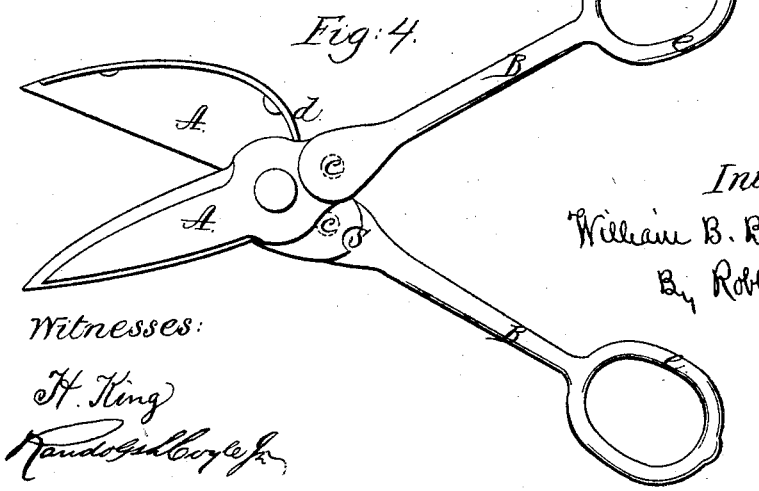

The handles B B of my improved shears may be made of wrought or malleable iron, brass, or other suitable metal. Their ends are rabbeted, as seen in the sectional Fig. 2, to receive the ends of the steel blades, and are each furnished with a rivet, $c$, which, projecting from the rabbet, passes through an aperture pierced in the blade A to receive it, and is headed upon the exterior surface thereof. Two rivets may be used; but a sufficiently secure joint is obtained with a single rivet, $c$, by forming a tongue or projection, S, upon the inner edge of the rabbet, which shall fit into a corresponding notch or recess in the end of the blade, as shown in Fig. 4. While a joint sufficiently strong and firm is thus secured, the steel is not injured by heat, as often occurs in the old process of welding, and the temper of the blade remains consequently unimpaired.

The blade A, which, when riveted to the handle B, is left projecting above the joint, as seen in Fig. 3, is so ground down and finished as to be flush and even with the arm $b$ of the handle B, presenting a neat appearance, as seen in Fig. 2.

Although the ordinary shoulders are thus dispensed with in my new form of shears, still the contact of the finger-bows $e\ e$, Fig. 4, prevents the overlapping of the ends of the blades, and they are prevented from opening too far by means of a simple stop placed upon one arm, or in lamp-trimmers by means of the guard $d$, Fig. 4.

In forming lamp-trimmers with the ordinary offset joints it will be seen, in the first place, that great care must be observed in grinding down the blade after it has been fitted to its handle, in order to avoid striking and injuring the shoulders, while the filing and fitting of the joints themselves is a matter of nicety and skill. In the second place, we find that in each blade of the ordinary lamp-trimmers the end which is to be attached to the handle must be left soft, in order to be filed down when forming the joint, while the rest of the blade is hardened and tempered for cutting. To accomplish this aim each blade must be taken up in tongs or pinchers and the cutting end alone be immersed in the tempering-bath. This separate handling and tempering of each blade necessarily requires time and care and involves a material cost.

In my improved trimmers or shears made without shoulders at the joints not only is there no time lost in fitting and forming the joint and no care required in grinding down the blades, except so far as is necessary in forming their edges, but the blades may be also tempered and hardened equally throughout from end to end by throwing them from the heating-pan into the tempering-bath all together instead of being held and dipped singly, one at a time. Thus a great saving of labor, trouble, and expense is effected, while at the same time by using rivets to secure the handles to the blades the loss of stock by overheating and spoiling the latter in welding them to the handles is avoided, so that my new style of lamp-trimmers are not only more perfect instruments than those heretofore made, but can be supplied to the public at a much less cost.

Having thus fully described my invention, what I claim therein as new, and desire to secure by Letters Patent, is—

Constructing improved shears or lamp trimmers substantially in the manner herein set forth.

The foregoing specification of my improvement in the manufacture of lamp-trimmers, shears, &c., signed by me this 10th day of October, A. D. 1864.

WM. B. BARNARD.

In presence of—
GEO. E. TERRY,
R. M. SMITH.